US008328892B2

(12) United States Patent
Comeau et al.

(10) Patent No.: US 8,328,892 B2
(45) Date of Patent: Dec. 11, 2012

(54) SOLUTION FOR FORMING POLISHING SLURRY, POLISHING SLURRY AND RELATED METHODS

(75) Inventors: Joseph K. V. Comeau, Essex Junction, VT (US); Marina M. Katsnelson, Burlington, VT (US); Matthew T. Tiersch, Essex Junction, VT (US); Eric J. White, Charlotte, VT (US)

(73) Assignee: International Business Machines Corporation, Armonk, NY (US)

( * ) Notice: Subject to any disclaimer, the term of this patent is extended or adjusted under 35 U.S.C. 154(b) by 805 days.

(21) Appl. No.: 11/930,236

(22) Filed: Oct. 31, 2007

(65) Prior Publication Data

US 2008/0053002 A1  Mar. 6, 2008

Related U.S. Application Data

(62) Division of application No. 11/465,176, filed on Aug. 17, 2006, now Pat. No. 7,824,568.

(51) Int. Cl.
| | |
|---|---|
| B24D 3/02 | (2006.01) |
| C09C 1/68 | (2006.01) |
| H01L 21/461 | (2006.01) |
| H01L 21/302 | (2006.01) |
| C09K 13/00 | (2006.01) |
| C09K 13/06 | (2006.01) |

(52) U.S. Cl. ......... 51/307; 438/692; 252/79.1; 252/79.4
(58) Field of Classification Search .................... 51/304, 51/307; 438/692; 252/79.1, 79.4
See application file for complete search history.

(56) References Cited

U.S. PATENT DOCUMENTS

| | | | | |
|---|---|---|---|---|
| 6,348,076 B1 * | 2/2002 | Canaperi et al. | .................. | 51/309 |
| 6,375,693 B1 * | 4/2002 | Cote et al. | .................. | 51/308 |
| 6,413,288 B2 * | 7/2002 | Yancey | ..................... | 51/309 |
| 6,632,377 B1 | 10/2003 | Brusic et al. | | |
| 6,812,193 B2 | 11/2004 | Brigham et al. | | |
| 2003/0013386 A1 | 1/2003 | Weinstein et al. | | |
| 2003/0073593 A1 * | 4/2003 | Brigham et al. | ............... | 510/175 |
| 2003/0116445 A1 | 6/2003 | Sun et al. | | |
| 2004/0040886 A1 * | 3/2004 | Tellkamp et al. | ............... | 206/714 |
| 2004/0152608 A1 | 8/2004 | Hsu | | |
| 2004/0229461 A1 | 11/2004 | Darsillo et al. | | |
| 2004/0266183 A1 | 12/2004 | Miller et al. | | |
| 2005/0026444 A1 | 2/2005 | Babu et al. | | |
| 2005/0090104 A1 | 4/2005 | Yang et al. | | |
| 2005/0159003 A1 | 7/2005 | Weinstein et al. | | |
| 2005/0211953 A1 | 9/2005 | Jha et al. | | |
| 2006/0042662 A1 | 3/2006 | Geret et al. | | |
| 2006/0199394 A1 * | 9/2006 | Takahashi et al. | ............ | 438/754 |
| 2006/0201914 A1 | 9/2006 | Uchikura et al. | | |
| 2006/0249482 A1 | 11/2006 | Wrschka et al. | | |
| 2008/0194116 A1 | 8/2008 | Farkas et al. | | |

FOREIGN PATENT DOCUMENTS

| | | | |
|---|---|---|---|
| WO | 2005042658 A1 | | 5/2005 |
| WO | WO 2005/086551 | * | 9/2005 |

OTHER PUBLICATIONS

Comeau et al., U.S. Appl. No. 11/465,176, Office Action Communication, Feb. 4, 2009, 9 pages.
Comeau et al., U.S. Appl. No. 11/465,176, Office Action Communication, Apr. 8, 2010, 6 pages.
Comeau et al., U.S. Appl. No. 11/465,176, Notice of Allowance and Fees Due, Jun. 28, 2010, 6 pages.
Comeau et al., U.S. Appl. No. 11/465,176, Office Action Communication, Jul. 7, 2008, 22 pages.
Comeau et al., U.S. Appl. No. 11/465,176, Office Action Communication, Jul. 28, 2009, 13 pages.
Jinling Chem, "1,2,3-Benzotriazole", Rugro Jinling Chemical Co., Ltd., http://www.jinlingchem.com/template/eproduct1.htm.
SCIENCELAB.COM, "Material Safety Data Sheet: Benzotriazole-1,2,3 MSDS", http://www.sciencelab.com/xMSDS-Melamine-9924600.
Comeau et al., U.S. Appl. No. 11/465,176, Office Action Communication, Jun. 9, 2007, 10 pages.
Comeau et al., U.S. Appl. No. 11/465,176, Office Action Communication, Nov. 11, 2009, 10 pages.
Comeau et al., U.S. Appl. No. 11/465,176, Office Action Communication, Oct. 27, 2008, 9 pages.
Yildirim, Application No. EP 07 81 4169, Supplementary European Search Report, Jul. 29, 2010, 5 pages.
Young, "PCT Search Report and Written Opinion of the International Searching Authority", Dec. 27, 2007, 8 pages.
Yildirim, EP Application No. 07814169.4-1217, "European Patent Examination Report", Nov. 8, 2011, 5 pages.
Tran, U.S. Appl. No. 12/876,518, Office Action Communication, Jun. 6, 2012, 34 pages.

* cited by examiner

*Primary Examiner* — Pegah Parvini
(74) *Attorney, Agent, or Firm* — Hoffman Warnick LLC; Anthony J. Canale

(57) ABSTRACT

A solution for forming a polishing slurry, the polishing slurry and related methods are disclosed. The solution for forming a polishing slurry may include 1 H-benzotriazole (BTA) dissolved in an ionic surfactant such as a sodium alkyl sulfate solution, and perhaps a polyacrylic acid (PAA) solution. The solution can be filtered and used in a polishing slurry. This approach to solubilizing BTA results in a high BTA concentration in a polishing slurry without addition of foreign components to the slurry or increased safety hazard. In addition, the solution is easier to ship because it is very stable (e.g., can be frozen and thawed) and has less volume compared to conventional approaches. Further, the polishing slurry performance is vastly improved due to the removal of particles that can cause scratching.

12 Claims, No Drawings

SOLUTION FOR FORMING POLISHING SLURRY, POLISHING SLURRY AND RELATED METHODS

CROSS-REFERENCE TO RELATED APPLICATIONS

This application is a divisional of U.S. patent application Ser. No. 11/465,176, filed on Aug. 17, 2006 now U.S. Pat. No. 7,824,568.

BACKGROUND OF THE INVENTION

1. Technical Field

The invention relates generally to chemical mechanical polishing slurries, and more particularly, to a solution for forming a polishing slurry, the polishing slurry and related methods.

2. Background Art

Chemical mechanical polishing (CMP) is a method of removing layers of solid carried out for the purpose of surface planarization and definition of metal interconnect pattern in semiconductor device fabrication. CMP includes mechanically polishing a wafer surface in a chemical slurry. 1 H-benzotriazole (BTA) is a corrosion inhibitor used in CMP slurries for copper materials. BTA is usually supplied as a solid at 98-99% purity. Commercial BTA material, however, often contains solid foreign material capable of scratching wafers. To reduce scratching, BTA is typically dissolved in a suitable solvent and filtered to remove the solid foreign material.

One approach to this filtering requirement is to dissolve the BTA in water. Water is advantageous as a solvent because it is the typical liquid medium for copper CMP slurry; hence, it does not have to be removed. Unfortunately, BTA is poorly soluble in water. As a result, filtering BTA in water requires an excessive volume of solution to be filtered, which is messy, costly and time-consuming. In addition, if the filtered solution is purchased commercially for filtering by the purchaser, a large volume of water needs to be shipped. In another approach, BTA is dissolved in solvents such as methanol, ethanol and isopropanol, in which it is highly soluble. This approach presents a number of shortcomings. For example, these solvents are not typically present in CMP slurries, and might require removal prior to use of the BTA as part of a polishing slurry. Second, the solvents are all flammable and, hence, present a flash point (safety) problem.

SUMMARY OF THE INVENTION

A solution for forming a polishing slurry, the polishing slurry and related methods are disclosed. The solution for forming a polishing slurry may include 1 H-benzotriazole (BTA) dissolved in an ionic surfactant such as a sodium alkyl sulfate solution, and perhaps, a polyelectrolyte such as polyacrylic acid (PAA) solution. The solution can be filtered and used in a polishing slurry. This approach to solubilizing BTA results in a high BTA concentration in a polishing slurry without addition of foreign components to the slurry or increased safety hazard. In addition, the solution is easier to ship because it is very stable (e.g., can be frozen and thawed) and has less volume compared to conventional approaches. Further, the polishing slurry performance is vastly improved due to the removal of particles that can cause scratching.

A first aspect of the invention provides a solution for use in forming a polishing slurry, the solution comprising: 1 H-benzotriazole (BTA) dissolved in an ionic surfactant solution.

A second aspect of the invention provides a method of forming a solution for use in forming a polishing slurry, the method comprising: obtaining 1 H-benzotriazole (BTA); and dissolving the BTA in an ionic surfactant solution to form the solution.

A third aspect of the invention provides a polishing slurry comprising: a first solution including 1 H-benzotriazole (BTA) dissolved in an ionic surfactant solution; and a second aqueous slurry solution.

A fourth aspect of the invention provides a method of forming a polishing slurry, the method comprising: obtaining a first solution including 1 H-benzotriazole (BTA) dissolved in an ionic surfactant solution; and adding the first solution to a slurry solution to form the polishing slurry.

The illustrative aspects of the present invention are designed to solve the problems herein described and/or other problems not discussed.

DETAILED DESCRIPTION

A solution for forming a polishing slurry, the polishing slurry and related methods are described. In one embodiment, a solution for use in forming a polishing slurry, i.e., a polishing slurry precursor, is provided. The solution includes 1 H-benzotriazole (hereinafter "BTA") ($C_6H_5N_3$) dissolved in an ionic surfactant solution. As used herein, BTA includes, but is not limited to: 1 H-benzotriazole, also known as 2,3-diazaindole, 1,2,3-benzotriazole, benzoisotriazole, benzotriazole, 1,2-amino-azophenylene, azimidobenzene, aziminobenzene, benzene azimide, 2,3-diazaindole, 1,2,3-triaza-1H-indene, 1,2,3-triazaindene, 2,3-diazaindole, 1,2,3-1 H-benzotriazole, 1-H-1 H-benzotriazole, 1,2-aminozophenylene or benzene azimide. (CAS registry number: 95-14-7, EINECS number: 202-394-1, and RTECS number: DM1225000). BTA exists in two tautomeric forms. The first tautomer has the formula 1 H-benzotriazole. The second tautomer has the formula 2H-benzotriazole and is also referred to as pseudo-azimidobenzene or 2,1,3-benzotriazole. The 1 H-tautomer represents the more stable and essentially exclusive molecular structure. The alkyl group may include, for example, hexa, octyl or any other alkyl group.

In one embodiment, BTA is initially in a powdered form such as in a needle crystalline form, however, it may also be provided in a granular form. The BTA may be dissolved in the ionic surfactant solution in any now known or later developed fashion. In one example, it may be necessary to add the BTA to the ionic surfactant solution slowly due to the volume of the BTA employed, as will be apparent in the examples described herein. In one embodiment, the ionic surfactant includes a sodium alkyl sulfate solution. Common alkyl groups may include one or more of the following: butyl-, pentyl-, hexyl-, heptyl-, octyl, nonyl-, decyl-, dodecyl-, tetradecyl-, etc. Where sodium octyl sulfate (NaOS) is used, it may be provided as an aqueous solution having approximately 30% sodium octyl sulfate by weight in the water ($H_2O$). However, other carriers and concentrations may also be employed within the scope of the invention. Aqueous sodium octyl sulfate solutions having this concentration are readily available commercially, e.g., under the Standapol® or Texapon® brand from Cognis or Polystep B-29® brand name from Stepan Products.

In an alternative embodiment, where the concentration of BTA is too significant for the ionic surfactant solution (e.g., sodium alkyl sulfate) to dissolve, the BTA may further be dissolved by adding a polyelectrolyte such as a polyacrylic acid (PAA) solution. In one embodiment, the PAA solution is provided as 61-65% PAA partial sodium salt in an aqueous solution. However, other polyelectrolytes, concentrations and carriers may be employed. Other polyelectrolytes may include, for example, polyacids and polybases or polyampholytes. Examples include polyacrylic acid, polymethacrylic acid, polyvinylsulfonic acid, polyacrylic acid co-maleic acid, polyethyleneimine, poly(4-vinylpridine), piperidine derivatives and piperazine derivatives. These polyelectrolytes are normally found in CMP formulations and help disperse the abrasives. The polyelectrolyte may be added in any now known or later developed fashion. In one embodiment, however, it may be advantageous to add the polyelectrolyte solution (e.g., aqueous PAA solution) in a manner that rinses any residual BTA into the solution to maintain proper concentration levels.

The ability of the solution to dissolve the BTA makes it such that the solution can be readily filtered in any now known or later developed fashion. This is in contrast to conventional approaches that use water, the volume of which prevents filtering efficiently. In one embodiment, the solution is filtered to substantially remove particles of larger than, for example, approximately 0.22 μm. That is, a 0.22 μm filter is used, and any particles passing through the filter remain in the solution. It is understood, however, that the invention is not limited to this particular size of filtering, and that other smaller particle sizes may be achievable. In one example, particles greater than 1 μm are reduced by greater than 98.5% and particles greater than 0.5 μm are reduced by greater than 97% with 0.22 μm filtration. Since the larger particles are removed, when the solution is used to form a polishing slurry, the polishing slurry shows improved performance, and in particular, greatly reduced scratching. In addition, this approach to solubilizing BTA results in a high BTA concentration in a polishing slurry without addition of foreign components to the slurry or increased safety hazard. In addition, the solution is easier to ship because it is very stable (e.g., can be frozen and thawed) and has significantly lower volume compared to conventional approaches.

In one embodiment, the polishing slurry formed using the above-described solution includes the solution including the BTA dissolved in the ionic surfactant solution (e.g., sodium alkyl sulfate), and a second slurry solution. As will be illustrated in the examples described herein, the second slurry solution may include at least one of the following: an abrasive, a salt, a polyelectrolyte, an oxidizer, de-ionized water, a chelater such as ethylene diamine tetra acetic acid (EDTA) and citric acid, and another surfactant(s). Abrasives may include, for example: ferric oxide, zirconia, ceria, titanium dioxide, silica, alumina and mixtures thereof. Examples include: Klebosol® brand silica abrasive slurry available from Rohm & Haas Electronic Materials or iCue® brand alumina slurry available from Cabot Microelectronics. An oxidizer may include, for example: oxidizing metal salts, oxidizing metal complexes, oxidizing acids such as nitric, persulfuric, peracetic, and periodic acids, iron salts such as nitrates, sulfates, potassium ferricyanide, hydrogen peroxide, aluminum salts, sodium salts, potassium salts such as potassium iodate, ammonium salts such as ammonium cerium nitrate, quaternary ammonium salts, phosphonium salts, chlorates, perchlorates such as potassium perchlorate, nitrates, permanganates such as potassium permanganate, persulfates and mixtures thereof. A chelater may include, for example: EDTA or citric acid. Other surfactant(s) may include, for example: anionic, cationic, nonionic and zwitterionic compounds including sodium alkyl sulfates, sodium alkyl sulfonates, Quaternary ammonium salts, and Nonyl ethers.

In another embodiment, a method of forming a solution for use in forming a polishing slurry is included in the invention. The method may include obtaining BTA, and dissolving the BTA in an ionic surfactant solution (e.g., sodium alkyl sulfate) to form the solution. As described above, the dissolving may further include dissolving the BTA in a polyelectrolyte such as a PAA solution. Filtering the solution is also provided, as described above, to substantially remove any particles larger than, for example, approximately 0.22 μm.

In another embodiment, the above-described method may be extended to provide a method of forming a polishing slurry. In this embodiment, a first solution is obtained, i.e., either by performing the above-described method or otherwise acquiring (e.g., purchasing) the solution. The first solution may include the solution described above including, for example, BTA dissolved in an ionic surfactant solution (e.g., sodium alkyl sulfate), and perhaps a polyelectrolyte such as a PAA solution, and may be filtered to substantially remove any particles larger than, for example, approximately 0.22 μm. The first solution is then added to a slurry solution to form the polishing slurry. As mentioned above, the slurry solution may include, for example, at least one of the following: an abrasive, a salt, a polyelectrolyte, an oxidizer, de-ionized water, a chelater, and another surfactant. The first solution dissolves smoothly in de-ionized water without the BTA coming out of solution (re-crystallizing due to being supersaturated).

The following examples illustrate various aspects of this invention. All parts and percentages are on a weight basis and all molecular weights are determined by, for example, gel permeation chromatography (GPC) and are weight averaged molecular weights unless otherwise indicated.

EXAMPLE 1

A solution for forming a polishing slurry was formed including a high concentration of BTA dissolved in an ionic surfactant solution including sodium alkyl sulfate solution (e.g., sodium octyl sulfate) and a PAA solution according to the following recipe.

| Solution: Chemical | Quantity |
| --- | --- |
| 1 H-benzotriazole (BTA) | approximately 1000-1600 grams |
| polyacrylic acid (PAA) solution (~61-65% polyacrylic acid partial sodium salt, MW 2000-20000) | approximately 1500-2000 grams |
| sodium alkyl sulfate solution (~30% in water) (e.g., Standapol) | approximately 1500-2000 ml |

The above listed amount of BTA is soluble in the above listed amount of sodium alkyl sulfate and PAA solution. The resulting solution was filtered through a 0.22 μm filter. The solution has a minimum volume and no foreign chemical components or increased safety hazard. In addition, the solution turns amber but does not deteriorate in functionality when held at 68° F. for 90 days, or cooled to −40° F. for 14 days. In the cooling condition, the solution completely freezes, and completely re-dissolves on thawing without shaking. Hence, transport of the solution is easier than conventional solutions. The solution is a single low particle, high BTA concentration solution that can be used to form the polishing slurry by addition of approximately 150 gallons of aqueous based slurry solution having one or more of the following, as described above: an abrasive, a salt, a polyelectrolyte, an oxidizer, de-ionized water, a chelater, and another surfactant. The particular formulation of polishing slurry tested was used for tantalum nitride (TaN).

EXAMPLE 2

A solution for forming a polishing slurry was formed including a lower concentration of BTA dissolved in a sodium alkyl sulfate solution according to the following recipe. In this case, sufficient sodium alkyl sulfate solution (e.g., sodium octyl sulfate) was present to dissolve the required amount of BTA for filtration.

| Solution: Chemical | Quantity |
|---|---|
| 1 H-benzotriazole (BTA) | approximately 700-1500 grams |
| sodium alkyl sulfate solution (~30% in water) (e.g., Standapol) | approximately 20-30 liters |

The above listed amount of BTA is soluble in the above listed amount of sodium alkyl sulfate solution. The resulting solution was filtered through a 0.22 μm filter. The solution has a minimum volume and no foreign chemical components or increased safety hazard. In addition, testing of the solution indicates no change in condition when held at room temperature (68° F.) for 90 days, or cooled to −40° F. for 14 days. In the cooling condition, the solution completely freezes, and completely re-dissolves on thawing without shaking. Hence, transport of the solution is easier than conventional solutions. The solution is a single low particle, high BTA concentration solution that can be used to form the polishing slurry by addition of the slurry solution of approximately 150 gallons of aqueous based slurry solution having one or more of the following, as described above: an abrasive, a salt, a polyelectrolyte, an oxidizer, de-ionized water, a chelater, and another surfactant. This particular polishing formulation was used for copper (Cu). More details on formulations can be obtained in U.S. Pat. No. 6,348,076 B1, which is hereby incorporated by reference.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of forming a high 1 H-benzotriazole (BTA) concentrate solution for use in forming a polishing slurry, the method consisting of:
    obtaining BTA;
    dissolving the BTA in a aqueous sodium alkyl sulfate and polyelectrolyte solution to form the high BTA concentrate solution, wherein a concentration of the BTA, in the high BTA concentrate solution is in the range of 19.61 wt % to 34.22 wt %; and
    filtering the high BTA concentrate solution.

2. The method of claim 1, wherein the polyelectrolyte is selected from the group consisting of: polyacrylic acid (PAA), polymethacrylic acid, polyvinylsulfonic acid, polyacrylic acid co-maleic acid, polyethyleneimine, poly(4-vinylpyridine), piperidine derivatives and piperazine derivatives.

3. The method of claim 1, wherein the sodium alkyl sulfate includes a sodium octyl sulfate having a concentration of approximately 30% in the water ($H_2O$).

4. The method of claim 1, wherein the BTA is initially in a powdered form selected from one of: a needle crystalline form and a granular form.

5. The method of claim 1, wherein the filtering removes particles larger than approximately 0.22 μm.

6. A method of forming a high 1 H-benzotriazole (BTA) concentrate solution for use in forming a polishing slurry, the method consisting of:
    obtaining BTA originally in a solid form having foreign material particles larger than approximately 0.22 μm;
    dissolving the BTA in an aqueous ionic surfactant solution to form the high BTA concentrate solution, wherein a concentration of the BTA in the high BTA concentrate solution is in the range of one of: 2.17 wt % to 6.67 wt % and 19.61 wt % to 34.22 wt %; and
    filtering the high BTA concentrate solution to remove particles larger than approximately 0.22 μm.

7. The method of claim 6, wherein the aqueous ionic surfactant solution is an sodium alkyl sulfate solution.

8. The method of claim 6, wherein the sodium alkyl sulfate is a sodium octyl sulfate having a concentration of approximately 30% in the water ($H_2O$).

9. A method of forming a high 1 H-benzotriazole (BTA) concentrate solution for use in forming a polishing slurry, the method consisting of:
    obtaining BTA;
    dissolving the BTA in an aqueous sodium alkyl sulfate solution to form the high BTA concentrate solution, wherein a concentration of the BTA in the high BTA concentrate solution is in the range of 2.17 wt % to 6.67 wt %; and
    filtering the high BTA concentrate solution.

10. The method of claim 9, wherein the aqueous sodium alkyl sulfate is a sodium octyl sulfate having a concentration of approximately 30% in the water ($H_2O$).

11. The method of claim 9, wherein the BTA is initially in a powdered form selected from one of: a needle crystalline form and a granular form.

12. The method of claim 9, wherein the filtering removes particles larger than approximately 0.22 μm.

* * * * *